May 26, 1970     W. C. KALAYJIAN     3,513,830
INSTRUMENT FOR OBTAINING BODY CULTURES
Filed Oct. 10, 1967
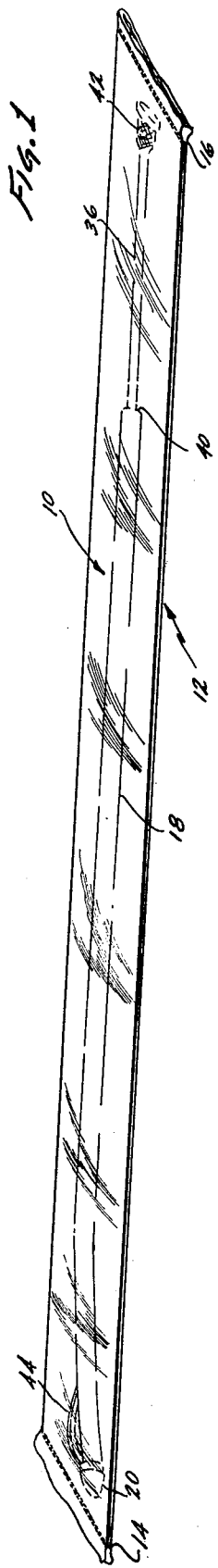
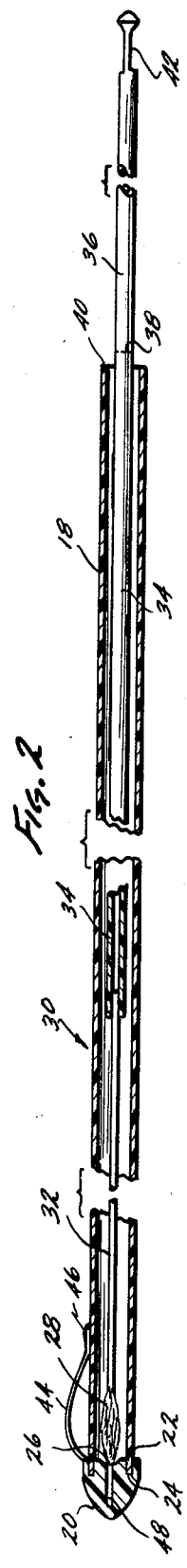
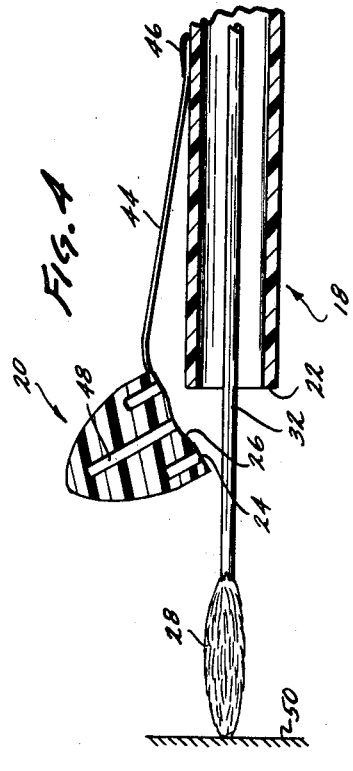
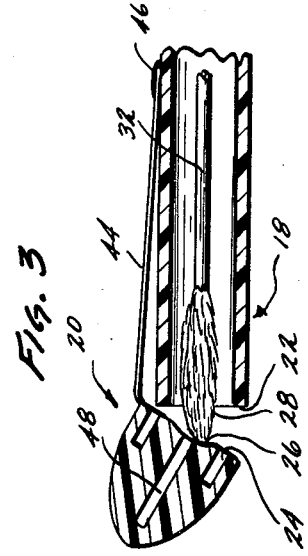
INVENTOR.
WAYNE C. KALAYJIAN
BY
Nilsson + Robbins
ATTORNEYS

United States Patent Office 3,513,830
Patented May 26, 1970

3,513,830
INSTRUMENT FOR OBTAINING BODY CULTURES
Wayne C. Kalayjian, 6050 Appian Way,
Long Beach, Calif. 90803
Filed Oct. 10, 1967, Ser. No. 674,138
Int. Cl. A61b 10/00
U.S. Cl. 128—2                        5 Claims

ABSTRACT OF THE DISCLOSURE

An instrument is disclosed for obtaining uncontaminated cultures from interior body organs that are located such that they may be reached through various contaminate-laden body passages. The structure is housed in a sterile package and includes an elongate tube adapted to be inserted through the body passage so that one end is contiguous to the organ of interest. The interior of the tube is shielded by a friction-fitted cap that is attached to the tube. A culture-swab rod bearing an absorbent tip is telescopically received within the tube so that the tip can force the cap off the tube providing the tip access to the organ of interest. After the desired culture is obtained (by direct contact), the culture-swab rod is withdrawn back into the tube for shielded withdrawal through the contaminated passage. The tube and the cap are made of flexible plastic in the illustrative embodiment while the culture-swab rod comprises a tubular handle of styrene, for example, fitted with a wooden stick, bearing an absorbent tip.

BACKGROUND AND SUMMARY OF THE INVENTION

A variety of body organs and body tissues are accessible to some degree through natural body passages. For example, nasal passages provide access to several internal tissue surfaces. Similarly, the female cervix affords access to the uterus and the mouth affords access to the pharynx, and the esophagus.

In the practice of medicine (veterinary as well as other branches) it frequently becomes desirable to obtain a test sample or culture from various internal body surfaces or tissues which are accessible through a natural body passage. However, the environment may be very unsanitary, and frequently the access passage is somewhat contaminated. As a result, obtaining a reasonably-true sample or culture directly from the organ of interest is quite unlikely. Specifically, for example, the insertion of a bare culture-swab through a body passage to engage the tissue of interest is normally impractical because (in withdrawing the swab) the sample is contaminated while moving through the access passage. This consideration is particularly true in the practice of veterinary medicine wherein the environment may be totally unsanitary.

In the past, a number of structures have been proposed with the objective of obtaining cultures or test samples from internal body tissues through natural passages. However, to the best of applicant's knowledge, such structures either have been ineffective or impractical to use. Therefore, a need has continued to exist for an economical, effective, and practical instrument for obtaining cultures in the manner considered above.

In general, the present invention is directed to a structure comprising an elongate tube having a friction-fitted cap at one end, which cap is mechanically attached to the tube so as to be loosely affixed when removed from a position of sealing relationship with the tube. An elongate culture-swab rod is then telescopically fitted into the tube, and includes an absorbent tip that is contiguous to the closure or cap of the tube. In using the structure, the closed end of the tube is inserted through a body passage to lie contiguous to the tissue of interest. From that location, the culture-swab rod is pushed through the tube disengaging the cap therefrom and contacting the tissue of interest (to obtain the desired culture). Subsequently, the culture-swab rod is withdrawn back into the tube for shielded removal from the body passage. Thus, the desired sample or culture is obtained in a pure form, i.e., free from other body contaminants. The structure as described is provided in a sterile form housed in a sealed package.

BRIEF DESCRIPTION OF THE DRAWINGS

In the drawing, which constitutes part of this specification, an exemplary embodiment demonstrating various objectives and features hereof is set forth; specifically:

FIG. 1 is a perspective view of an instrument constructed in accordance with the present invention;

FIG. 2 is a fragmentary, enlarged vertical section taken centrally through the structure of FIG. 1;

FIG. 3 is an enlarged fragmentary view of FIG. 2 illustrating one phase of operation for the structure; and FIG. 4 is another enlarged fragmentary view similar to that of FIG. 3 illustrating another operating phase for the structure.

DESCRIPTION OF THE ILLUSTRATIVE EMBODIMENT

As required, a detailed illustrative embodiment of the invention is disclosed herein. However, it is to be understood that this embodiment merely exemplifies the invention which may be embodied in many forms that are quite different from the illustrative embodiment. Therefore, specific structural and functional details disclosed herein are not to be interpreted as limiting, but rather merely as a basis for the claims defining the scope of the invention.

Referring initially to FIG. 1, there is shown an instrument 10 housed in a somewhat transparent package 12. The package may comprise an elongate sleeve of plastic film closed at its ends by seals 14 and 16. It is generally important that these seals hermetically close the package 12 so that environmental bacteria and other contaminants may not reach the instrument 10.

Considering the instrument in greater detail, an elongate tube 18 (FIG. 2) carries a friction-fitted cap 20 at its operating end 22. The cap 20 is of a somewhat conical exterior configuration affording the desirable smooth surfaces characteristic of a probe. The rear of the cap 20 defines an annular channel 24 which matingly receives the end 22 of the tube 18. Furthermore, the rear of the cap 20 defines an indentation 26 affording an abutment surface for the absorbent tip 28 of a culture-swab rod 30.

The tip 28 may comprise cotton or the like and is fitted on the end of a stick 32 which is telescopically received in an elongate hollow rod 34. The rod 34 in combination with the stick 32 is of greater length than the tube 18 so that a section 36 of the rod 34 extends out of the tube 18 when the tip 28 abuts the indentation 26 on the positioned cap. An index mark 38 is provided on the rod 34 for use in cooperation with the external end 40 of the tube 18 to manifest the position of the tip 28 in relation to the operating end 22 of the tube 18. The external end section 36 of the rod 34 terminates in a flattened enlargement 42 which may be utilized as a handle and which also limits the depth to which the rod 30 may be forced through the tube 18.

Of course, the structure hereof may be variously manufactured of many different materials; however, in one exemplary embodiment, it has been found economical and practical to provide the tube 18 of semi-soft flexible plastic. In such an embodiment, the cap 20 is formed of a similar material and is affixed to the tube 18 by a retainer tab 44. Of course, the tube 18 may comprise simply a section of uniform extruded material while the cap 20 along with the tab 44 may be integrally formed in an injection mold.

The tab 44 is affixed to the exterior of the tube 18 by a weld 46, accomplished by the application of heat and pressure. Somewhat in this regard, it has been found desirable to limit the length of the tab 44 to between ½ and 1½ inches, however, to maintain it above twice the length of the cap 20. That is, by providing the tab 44 within that range of length, good withdrawal characteristics have been accomplished. Of course, the cross-sectional size of the tab is as small as reasonably possible commensurate with the required strength.

Again considering a particular embodiment hereof, it has been found desirable to employ a conventional swab stick 32 of the type that are mass-produced in a sterile form. This stick 32 is telescopically received in the hollow rod 34 which comprises a tube closed at the external end by the flattened enlargement 42. When the rod 34 is made of styrene, the mark 38 may be easily etched thereon sufficiently to clearly show through the walls of the tube 18. A friction fit between the stick 32 and the rod 34 has been found completely adequate; however, if desired adhesives or other jointing materials and structures may be employed.

Subsequent to assembly, the structure as shown in FIG. 2 may be variously sterilized in a gaseous or liquid medium before or after it is placed in the package 12. Of course, various techniques as well known in the prior art may be employed for combined packaging and sterilizing procedures to accomplish the sterile package.

Subsequent to completing the article, as depicted in FIG. 1, it may be variously stored and transported preliminary to actual use. At the time when it is desired to actually employ the instrument, the seal 16 is broken and the instrument 10 is withdrawn from the package 12. During removal from the package some care may be exercised to avoid contact with the instrument which might severely contaminate surfaces thereon. However, as long as the guard cap 20 is in place, the inside of the tube and the tip 28 remain sterile. Therefore, the user need not exercise great care in this regard.

Next, the cap 20 and the leading end 22 of the instrument is inserted through a body orifice into the passage affording access to the tissue from which a sample is to be obtained. In general, it is advisable to pass the instrument with the tab 44 in a downward position, easing the instrument through the body passage.

At a time when the cap 20 is determined to be contiguous to the tissue of interest, the external end 40 of the tube 18 is firmly held while the section 36 is forcibly urged into the tube 18. As a result, the tip 28 forcibly engages the indentation 26 above a bore 48, forcing the cap 20 from the tube 18 substantially as illustrated in FIG. 3. It is to be noted in this regard that as a result of the mating engagement between the channel 24 and the end 22 of the tube 18, both the interior and exterior circular surfaces of the tube end 22 have been preserved sterile in passing through the body passage.

Further insertion of the section 36 into the tube 18 moves the tip 28 (FIG. 4) into contact with a tissue surface 50 from which mucuous or other test-sample substance is taken. Subsequently, the section 36 (FIG. 2) is withdrawn in relation to the tube 18 drawing the tip 28 (FIG. 4) from the position shown back into the tube 18. Thus, the tip 28, bearing the desired test substance, is withdrawn to a shielded and sterile environment in which it may be withdrawn through the body passage for analysis. It is to be noted, that in removing the tube 18, the cap 20 simply trails suspended on the tab 44. The double-length tab 44 allows considerable lateral movement by the cap 20, to thereby facilitate withdrawal of the structure through the body passage.

As will be readily apparent to those skilled in the art, the structure hereof affords an effective means of obtaining a test substance or culture from tissue inside a body. In general, the embodiment disclosed above is of approximately 24 inches length and was designed for use in horses, cows, and like domestic animals. However, it is to be understood that the basic structure hereof may be readily produced with size and design modifications for utilization in any body, including the human body.

Although the illustrative embodiment disclosed herein has been set forth in considerable detail, it is to be emphasized that such detail, along with the specific structure thereof shall not impose a limitation upon the scope hereof; rather, the matter shall be interpreted in accordance with the claims as set forth below.

What is claimed is:

1. An instrument for obtaining uncontaminated cultures from interior body tissue through contaminate-laden passages, comprising:

an elongate tube having an operating end for insertion through said passage to the location of said tissue;

cap means for shielding the operating end of said tube while passing through said passage said cap means including a cover, friction fitted to said operating end, and an elongate flexible tab affixed between said cover and said elongate tube; and a culture swab rod of greater length than said elongate tube, said rod being telescopically fitted in said tube in sliding relationship therewith, whereby to be forced toward said operating end of said tube to disengage said cap means therefrom, and to extend out of the operating end of said elongate tube, to engage said tissue, and subsequently returned therewith.

2. An instrument according to claim 1 wherein said elongate tube comprises a somewhat flexible, uniform size tube.

3. An instrument according to claim 1 wherein said closure comprises a friction cap defining an interior annular channel to matingly receive said operating end of said tube.

4. An instrument according to claim 1 wherein said tab comprises a flexible length of material affixed between said cap and said tube; wherein said elongate tube comprises a somewhat flexible, uniform size tube; and wherein said culture swab rod comprises an elongate tube, bearing an absorbent tip on one end thereof.

5. An instrument according to claim 1 wherein said tube and said closure comprise flexible plastic material and said culture swab rod is indexed to indicate position relative said tube.

References Cited

UNITED STATES PATENTS

| | | | |
|---|---|---|---|
| 2,413,480 | 12/1946 | Winter | 128—263 |
| 2,854,978 | 10/1958 | Millman et al. | 128—26 XR |
| 2,922,423 | 1/1960 | Rickard et al. | 128—263 |
| 3,037,496 | 6/1962 | Melges | 128—2 |
| 3,154,080 | 10/1964 | Rowan et al. | 128—349 |
| 3,160,327 | 12/1964 | Porcelli. | |
| 3,282,114 | 11/1966 | Pell | 128—2 XR |
| 3,394,699 | 7/1968 | Koett | 128—2 |

FOREIGN PATENTS

| | | |
|---|---|---|
| 1,000,022 | 8/1965 | Great Britain. |

RICHARD A. GAUDET, Primary Examiner

K. L. HOWELL, Assistant Examiner

U.S. Cl. X.R.

206—63.2; 128—269